United States Patent
Xu (10) Patent No.: US 10,725,293 B2
(45) Date of Patent: Jul. 28, 2020

(54) DISPLAYING SYSTEM, METHOD, AND VEHICLE INCLUDING SUCH A DISPLAYING SYSTEM

(71) Applicant: Futurus Technology Co., Ltd., Beijing (CN)

(72) Inventor: Junfeng Xu, Beijing (CN)

(73) Assignee: FUTURUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/461,506

(22) Filed: Mar. 17, 2017

(65) Prior Publication Data
US 2017/0269361 A1 Sep. 21, 2017

(30) Foreign Application Priority Data

Mar. 17, 2016 (CN) .......... 2016 1 01511427
Nov. 9, 2016 (CN) .......... 2016 1 09711436

(51) Int. Cl.
| | | |
|---|---|---|
| G02B 27/01 | (2006.01) | |
| G02B 5/30 | (2006.01) | |
| B60K 35/00 | (2006.01) | |
| G02B 1/11 | (2015.01) | |
| G02B 27/14 | (2006.01) | |

(52) U.S. Cl.
CPC .......... *G02B 27/0101* (2013.01); *B60K 35/00* (2013.01); *G02B 1/11* (2013.01); *G02B 5/30* (2013.01); *G02B 27/144* (2013.01); *B60K 2370/155* (2019.05); *B60K 2370/1529* (2019.05); *B60K 2370/27* (2019.05); *B60K 2370/334* (2019.05); *B60K 2370/66* (2019.05); *B60K 2370/785* (2019.05); *G02B 2027/0118* (2013.01)

(58) Field of Classification Search
CPC ............ G02B 27/0101; G02B 27/0112; G02B 27/0114; G02B 27/0172
See application file for complete search history.

(56) References Cited

U.S. PATENT DOCUMENTS 2,403,731 A * 7/1946 MacNeille .......... G02B 27/142
359/485.02
3,610,729 A * 10/1971 Rogers .................. G02B 5/305
359/485.03
(Continued)

FOREIGN PATENT DOCUMENTS

| CN | 2694293 | 4/2005 |
|---|---|---|
| CN | 103018796 A | 4/2013 |

(Continued)

*Primary Examiner* — Cara E Rakowski
(74) *Attorney, Agent, or Firm* — Dilworth & Barrese, LLP.; Michael J. Musella, Esq.

(57) ABSTRACT

The embodiments disclosed in this application describe a displaying system, a displaying method, and a head-up display. The displaying system includes a display window including a transflective film, an image source for emitting s-polarized light incident on the transflective film, where the transflective film has an average reflectivity more than 50% for the s-polarized light, and where the imaging window is further used to transmit ambient light. The embodiments disclosed herein can reduce the demand on the brightness of the image source, can eliminate ghost image, obtain better visual effect, and reduce cost.

20 Claims, 9 Drawing Sheets

(56) References Cited

U.S. PATENT DOCUMENTS

| | | | | |
|---|---|---|---|---|
| 5,882,774 | A * | 3/1999 | Jonza | G02B 27/283 359/577 |
| 6,952,312 | B2 * | 10/2005 | Weber | G02B 27/0101 359/630 |
| 6,952,313 | B2 | 10/2005 | Schrader | |
| 7,123,418 | B2 | 10/2006 | Weber et al. | |
| 7,355,796 | B2 | 4/2008 | Robinson | |
| 2004/0008412 | A1 * | 1/2004 | Jiang | G02B 27/283 359/487.02 |
| 2004/0136082 | A1 * | 7/2004 | Cado | G02B 27/0101 351/159.56 |
| 2005/0012682 | A1 | 1/2005 | Jenson et al. | |
| 2006/0007055 | A1 | 1/2006 | Larson et al. | |
| 2012/0038989 | A1 * | 2/2012 | Louarn | G02B 1/111 359/580 |
| 2016/0274356 | A1 * | 9/2016 | Mason | G02B 27/0081 |

FOREIGN PATENT DOCUMENTS

| | | | | |
|---|---|---|---|---|
| CN | 103487942 | A | 1/2014 | |
| CN | 104267498 | A | 1/2015 | |
| CN | 204143067 | U | 2/2015 | |
| CN | 105093534 | A | 11/2015 | |
| EP | 0836108 | A2 | 4/1998 | |
| JP | 2014-001720 | A | 1/2014 | |
| WO | WO 2010034936 | A1 * | 4/2010 | G02B 1/111 |
| WO | 2015186506 | A1 | 12/2015 | |

* cited by examiner

DISPLAYING SYSTEM, METHOD, AND VEHICLE INCLUDING SUCH A DISPLAYING SYSTEM

CROSS REFERENCE TO RELATED APPLICATIONS

This application claims priorities to CN Application No. 2016101511427, filed on Mar. 17, 2016, and CN Application No. 2016109711436, filed on Nov. 9, 2016, the entire contents of which are incorporated herein by reference.

FIELD OF THE DISCLOSURE

The embodiments of the present invention relate to the field of optoelectronic technology, and more particularly, to a displaying system and a corresponding imaging method; and also to a vehicle including the displaying system.

BACKGROUND OF THE DISCLOSURE

A transparent displaying system typically consists of an image source and an imaging window. In existing transparent displaying systems, there are a variety of choices for the image source and the imaging window. An imaging window is usually composed of a substrate and a reflective surface, and most of the imaging windows adopt the structure in which the reflective surface serves as an interlayer in the substrate.

In the prior art, there are technical solutions utilizing a source emitting p-polarized light as the image source. For example, an imaging method using p-polarized light is mentioned in Chinese Patent Publications CN204143067U and CN104267498A, U.S. Pat. Nos. 6,952,312B2; 7,123, 418B2; and 7,355,796B2, and European Patent Application EP0836108A2.

These p-polarized light based imaging methods, however, generally have the following drawbacks: if a relatively high reflectivity is required, then the transmissivity will be lowered, thereby reducing the viewing effect of the external environment, resulting in a relatively high demand on the brightness of the image source.

For example, when such methods are applied to a head-up display, a dark spot will be formed in the front window. If a relatively high transmissivity is required, the reflectivity will be lowered; in order to achieve a good imaging effect, there will be a relatively high demand on the brightness of the image source, which increases cost on power dissipation of the image source and the like.

In the prior art, a technique using a source that emits s-polarized light as the image source has been proposed. For example, U.S. Published Patent Application No. US2005012682 and Japanese Patent JP2-141720A both mention an imaging method using s-polarized light. However, such s-polarized light-based imaging methods have the following drawbacks:

1. a ghost image can be easily generated;
2. if a relatively high reflectivity is required, then the transmissivity will be reduced, thus reducing the viewing effect of the external environment.

Chinese patent CN2694293Y discloses a full color multiband stack film applied in a head-up display which utilizes the interference principle of the multi-layer film of the dielectric layer. The disadvantage of this technique is that the transmissivity of light of a specific wavelength is not high. For example, the low transmissivity for particular wavelengths such as red, green, blue light will greatly reduce the light (red, green, yellow light) emitted from traffic signal lamps, causing a potential safety hazard. Moreover, the imaging angle of the technique is limited, and the imaging effect is not good; besides, the technique requires coating about 70 layers of films, so that the manufacturing process is too complicated.

SUMMARY OF THE EMBODIMENTS OF THE PRESENT INVENTION

In order to overcome the above shortcomings, a displaying system, a displaying method and a vehicle having the displaying system are provided in the technical solution of the present invention. The technical solution of the invention reduces the brightness demand on the image source, saves energy consumption, enables a ghost-free clear imaging, and permits good transmission of ambient light, which will not reduce the viewing effect of the external environment.

According to an embodiment of the present invention, there is provided a displaying system, comprising:

an imaging window including a transparent substrate and a transflective film attached to a first surface of the transparent substrate;

an image source that emits s-polarized light incident on the imaging window through the transflective film, wherein the s-polarized light emitted by the image source has N spectral lines or bands in the visible light band, where N is a positive integer not less than 1; and where the N spectral lines or bands each have a FWHM (full-width at half-maximum) equal to or less than 60 nm, and for each of the N spectral lines or bands in the visible spectra of the s-polarized light emitted from the image source, a major band is defined as the spectra band centered at the peak of the line or the band and expanding up to the FWHM;

the transflective film being capable of reflecting the s-polarized light emitted by the image source in a first angle range with respect to the normal line, and meanwhile capable of transmitting ambient light in a second angle range with respect to the normal line, where the first angle range is 30 to 89 degrees, and the second angle range is 30 degrees to 80 degrees;

in the first angle range, the average s-polarized reflectivity, of the transflective film, of at least one of the N major bands, is greater than 50%, with the at least one of the N major bands being defined as at least one principal band; in the first angle range, the average s-polarized reflectivity, of the transflective film, for visible bands outside the N major bands, is at least 5% lower than that for the at least one principal band;

in the second angle range, the transflective film has an average transmissivity greater than 60% for p-polarized light in the visible range.

Preferably, the substrate has a first surface and a second surface; the transflective film is arranged on the first surface, and light emitted from the light source passes through the transflective film before reaching the substrate.

Preferably, an anti-reflection film is disposed on the second surface; the anti-reflection film increases the average transmissivity of the imaging window for visible light by 3% or more.

Preferably, the N spectral lines or bands comprise at least three spectral lines or bands, where a peak position of the first spectral line or band is in the range of 410 nm to 480 nm; a peak position of the second spectral line or band is in the range of 500 nm to 565 nm, and a peak position of the third spectral line or band is in the range of 590 nm to 690 nm.

Preferably, the first angle range is 50 degrees to 75 degrees.

Preferably, the second angle range is 55 degrees to 70 degrees.

Preferably, within the second angle range, the transflective film has an average transmissivity greater than 80% for the p-polarized light in the visible range.

Preferably, the transflective film has an average reflectivity greater than 70% for the N major bands within the first angle range; and the transflective film has an average reflectivity less than 50% for visible light band outside the N major bands.

Preferably, there is an angle between the plane of the image source and the imaging window, where the angle is in the range of 20 to 70 degrees.

Preferably, there is an angle between the plane of the image source and the imaging window, where the angle is in the range of 80 to 90 degrees.

Preferably, the image source is a displaying apparatus that emits a virtual image or a real image, or a virtual or real image formed by such displaying apparatus.

Preferably, the light source of the image source comprises a laser, a light emitting diode, an organic light emitting diode, an excited fluorescent light emitting material, a quantum dot excitation light source, or any combinations thereof.

According to another embodiment of the present invention, there is provided a displaying system, comprising:

an imaging window including a transparent substrate having a first surface and a second surface, a transflective film attached to the first surface of the transparent substrate, and an anti-reflection film attached to the second surface of the transparent substrate; and an image source for emitting s-polarized light incident on the imaging window through the transflective film, where the s-polarized light emitted by the image source has N spectral lines or bands in the visible light band, where N is a positive integer not less than 1; and where the spectral lines or bands have a FWHM equal to or less than 60 nm, and for each of the N spectral lines or bands in the visible spectra of the s-polarized light emitted from the image source, a major band is defined as the spectra band centered at the peak of the line or the band and expanding up to the FWHM;

the transflective film capable of reflecting the s-polarized light emitted by the image source in a first angle range with respect to the normal line, and also capable of transmitting ambient light in a second angle range with respect to the normal line, where the first angle range is 30 to 89 degrees, and the second angle range is 30 degrees to 80 degrees;

in the first angle range, the transflective film has an average reflectivity in the range of 25% to 50% for the N major bands; the transflective film has an average reflectivity for visible light bands outside the N major bands at least 5% lower than the average reflectivity for the N major bands;

the transflective film has an average transmissivity greater than 60% for p-polarized light in the visible range within the second angle range; and the anti-reflection film increases the average transmissivity of the imaging window for visible light by at least 3%.

According to a further embodiment of the present invention, there is provided a displaying system, comprising:

an imaging window comprising a transflective film;

an image source that emits s-polarized light incident toward the imaging window through the transflective film;

wherein the transflective film has an average reflectivity of more than 50% for the s-polarized light in the visible range; where the imaging window is further configured to transmit ambient light;

where the transflective film has an average transmissivity greater than 80% for the p-polarized light in the visible range.

According to another embodiment of the present invention, there is provided a displaying system comprising:

an imaging window including a transparent substrate having a first surface and a second surface, a transflective film attached to the first surface of the transparent substrate, and an anti-reflection film attached to the second surface of the transparent substrate; and an image source for emitting s-polarized light incident on the imaging window through the transflective film;

where the transflective film has an average reflectivity greater than 50% for s-polarized light;

where the imaging window is also used to transmit ambient light; and where the anti-reflection film increases the average transmissivity of the imaging window for visible light by at least 3%.

According to an embodiment of the present invention, there is provided a head-up display comprising a displaying system as described above.

According to another embodiment of the present invention, there is provided a vehicle comprising a displaying system as described above.

According to an embodiment of the present invention, there is provided a displaying method comprising:

(1) providing an imaging window comprising a transparent substrate and a transflective film attached to the transparent substrate;

(2) providing an image source capable of emitting s-polarized light;

(3) causing the image source to emit s-polarized light toward the imaging window in a first angle range with respect to the normal line, wherein the polarized light is directed toward the imaging window through the transflective film;

(4) reflecting the s-polarized light through the transflective film;

where, within the first angle range, the transflective film has an average reflectivity greater than 50% for a waveband within the FWHM of at least one of the N spectral lines or bands of the s-polarized light emitted by the image source; and the transflective film has an average reflectivity for visible light band outside the FWHM of the N spectral lines or bands of the s-polarized light emitted by the image source at least 5% lower than the average reflectivity, which is greater than 50%, for the waveband within the FWHM of the N spectral lines or bands of the s-polarized light emitted by the image source;

where the transflective film has an average transmissivity greater than 60% for p-polarized light in the visible range within the second angle range; and where the first angle range is 30 degrees to 89 degrees, and the second angle range is 30 degrees to 80 degrees.

According to another embodiment of the present invention, there is provided a displaying method, comprising:

(1) providing an imaging window comprising a transparent substrate, and a transflective film and an anti-reflection film disposed respectively at the two sides of the transparent substrate;

(2) providing an image source capable of emitting s-polarized light;

(3) causing the image source to emit s-polarized light incident towards the imaging window in a first angle range with respect to the normal line, where the polarized light is incident towards the imaging window through the transflective film;

(4) reflecting the s-polarized light using the transflective film;

where the s-polarized light has N spectral lines or bands in the visible light band, where N is a positive integer not less than 3; the FWHM of the spectral lines or bands is less than or equal to 60 nm;

where, the transflective film, within the first angle range, has an average reflectivity in the range of 25% to 50% for a waveband within the FWHM of the N spectral lines or bands of the s-polarized light emitted by the image source;

the transflective film has an average reflectivity for visible light band outside the FWHM of the N spectral lines or bands of the s-polarized light at least 5% lower than the average reflectivity for a waveband within the FWHM of the N spectral lines or bands of the s-polarized light; and the transflective film, within the second angle range with respect to the normal line, has an average transmissivity greater than 60% for p-polarized light in the visible range;

where the first angle range is 30 degrees to 89 degrees, and the second angle range is 30 degrees to 80 degrees.

According to a further embodiment of the present invention, there is provided a displaying method, comprising:

(1) providing an imaging window comprising a transparent substrate and a transflective film attached to the transparent substrate;

(2) providing an image source capable of emitting s-polarized light;

(3) causing the image source to emit s-polarized light incident towards the imaging window through the transflective film; and (4) reflecting the s-polarized light by the transflective film, where the transflective film has an average reflectivity greater than 50% for the s-polarized light, and has an average transmissivity greater than 80% for p-polarized light.

According to another embodiment of the present invention, there is provided a displaying method, comprising:

(1) providing an imaging window comprising a transparent substrate, and a transflective film and an anti-reflection film disposed respectively at two sides of the transparent substrate;

(2) providing an image source capable of emitting s-polarized light;

(3) causing the image source to emit s-polarized light incident towards the imaging window through the transflective film;

(4) using the transflective film to reflect the s-polarized light, where the transflective film has an average reflectivity greater than 50% for the s-polarized light, and (5) using the anti-reflection film to transmit ambient light, where the anti-reflection film increases an average transmissivity of the imaging window for visible light by 3% or more.

As can be seen from the above-described technical solutions, instead of using a source emitting p-polarized light as the image source, the embodiments of the present invention creatively use a source emitting s-polarized light including one or more spectral lines or bands as the image source, and meanwhile use a band-reflecting feature imaging window corresponding to the image source for s-polarized light including spectral lines or bands, thus overcoming the drawbacks of the s-polarized light based imaging system, greatly facilitating the user's view of displayed image while viewing the external environment, and reducing the demand on the brightness of the image source.

Moreover, the embodiments of the present invention can obtain a relatively high reflectivity through the transflective film on the inner surface of the substrate, and can adequately suppress ghost images due to the existence of the anti-reflection film on the outer surface of the substrate.

In addition, the embodiments of the present invention can obtain the same optical information from p-polarized ambient light even if the s-polarized spectrum of the ambient light has partially filtered waveband. The embodiments of the present invention hardly affect the observer's perception of ambient light. Also, since the transflective film and the anti-reflection film are attached to the substrate by, for example, a coating technique, the embodiments of the present invention are relatively inexpensive.

BRIEF DESCRIPTION OF THE DRAWINGS

In order to more clearly illustrate the embodiments of the present invention or the technical solutions of the prior art, the drawings used for describing the embodiments or the prior art will be briefly described below. It will be apparent that the drawings described below merely describe parts of the embodiments of the present invention. These drawings are not to be construed as limiting the invention, but are illustrative.

DETAILED DESCRIPTION OF THE EMBODIMENTS OF THE PRESENT INVENTION

In order to make the object, technical solution and advantages of the present invention clearer, the present invention will be described in further detail with reference to the accompanying drawings.

For purposes of brevity and intuition, the solution of the embodiments of the present invention will be described by describing a number of representative embodiments. Numerous details in the embodiments are provided solely to aid in understanding the embodiments of the present invention. It will be apparent that the technical solution of the invention may be implemented without being limited to these details. In order to avoid unnecessarily obscuring embodiments of the present invention, some embodiments are not described in detail, but only frames are presented. In the following text, "comprising" means "comprising, but is not limited to . . . ", "according to . . . " means "at least according to, but not limited to . . . ", and "first", "second" and the like are used for reference to a feature only and are not intended to impose any limitation, e.g., a sequential limitation, on the feature. Due to the habit in Chinese language, when the number of a component is not specified, it means that the component can be one or more, or can be understood as at least one.

Figure 1:
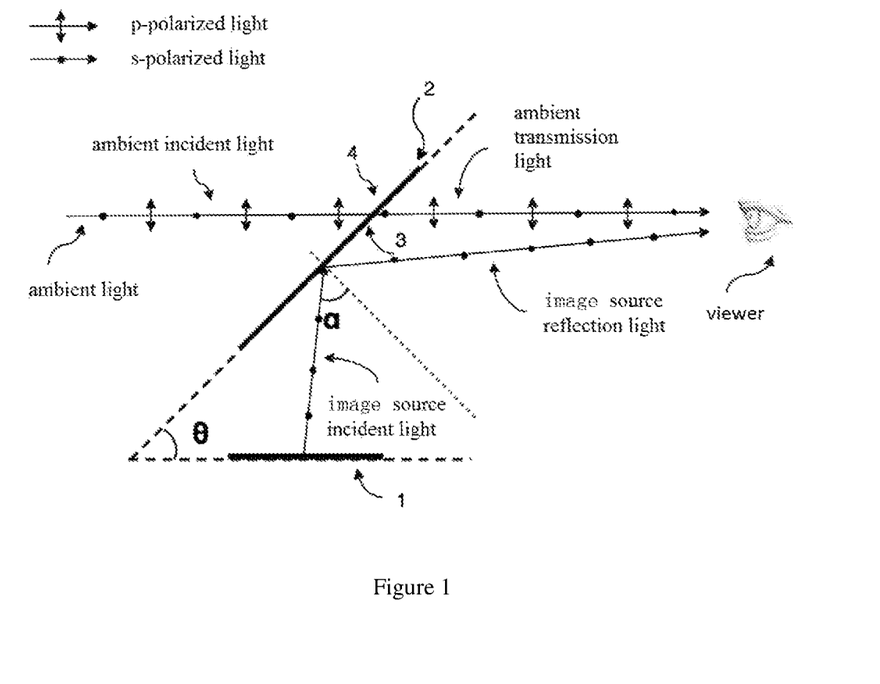
FIG. 1 is an exemplary structural diagram of a displaying system according to one embodiment of the present invention.

FIG. 1 is an exemplary structural diagram of a displaying system according to one embodiment of the present invention.

As shown in FIG. 1, the system includes an image source 1 and an imaging window 2. The imaging window 2 includes a transparent substrate and a transflective film 3 attached to one side of the substrate. The image source 1 can emit s-polarized light. The s-polarized light has N spectral lines or bands in the visible light band, wherein N is a positive integer not less than 1, and the FWHM of the spectral lines or bands is 60 nm or less. The s-polarized light is incident on the imaging window 2 through the transflective film 3. The transflective film 3 has an average reflectivity greater than 50% for a waveband within the FWHM of at least one of the N spectral lines or bands of the s-polarized light emitted by the image source. The imaging window 2 can also allow transmission of ambient light. In the embodiment shown in FIG. 1, the imaging window 2 further includes an anti-reflection film 4 (it is to be understood, an anti-reflection film may not be used in other embodiments), which is attached to the other side of the substrate. The anti-reflection film 4 can increase the ambient light transmissivity of the imaging window 2.

The image source 1 may be a displaying apparatus, or a virtual image or a real image formed by such displaying apparatus.

For example, the displaying apparatus may be a liquid crystal screen, where the backlight light source of the liquid crystal screen may be a laser, a light emitting diode, an organic light emitting diode, an excited fluorescent light emitting material, a quantum dot excitation light source, or combinations thereof; the displaying apparatus may also be an active emitting lattice screen composed of a light-emitting point light source such as an LED, an OLED, a plasma light emitting point, or the like; the displaying apparatus may also be a projection imaging system based on such projection techniques such as DLP, LCOS and LCD, with the light source of LED, OLED, laser, or fluorescent light source or a combination thereof, reflected or transmitted through a display panel such as a DMD, an LCOS, and an LCD, and projected onto a projection screen via a projection lens for imaging; the displaying apparatus may also be a projection imaging system which images as the laser beams scan on a screen.

The real or virtual image formed by all the above-mentioned displaying apparatuses through a single or multiple times of refractions or reflections can also be used as an image source.

The substrate of the imaging window 2 may be made of a transparent material such as a PC resin, a PET resin, a PMMA resin, glass, quartz, or the like, and may also be subjected to a special treatment to have both transparent and color-changing properties. For example, in strong light conditions, the substrate may change color to reduce ambient light intensity.

The transflective film 3 may be arranged to cover the entire inner surface of the substrate, or may cover part of the inner surface of the substrate. The transflective film 3 may be a single layer film or formed by stacking multiple film layers having different refractive indexes, where the composition of each film layer is selected from oxides, fluorides, nitrides, and the like, such as tantalum pentoxide, titanium oxide, magnesium oxide, zinc oxide, zirconium oxide, silicon dioxide, magnesium fluoride, silicon nitride, silicon oxynitride, aluminum fluoride, or combinations thereof.

The higher the average reflectivity of the transflective film 3 for the s-polarized light in the visible light range, the greater the intensity of the visible light reflected by the transflective film 3 to the observer. It has been found through tests that the average reflectivity of the transflective film 3 for wavebands within FWHM of at least one of the N spectral lines or bands of the s-polarized light emitted by the image source is greater than a specific reflectivity, for example, greater than 50%, preferably greater than 60%, 70%, 80%, or 90%, and more preferably greater than 95%; the average reflectivity of the transflective film 3 for visible light band outside the FWHM of the N spectral lines or bands of the s-polarized light emitted by the image source is lower than the average reflectivity of the transflective film 3 for the waveband within FWHM of the N spectral lines or bands of the s-polarized light emitted by the image source which is greater than the specific reflectivity by at least 5%, preferably 10%, 15%, or even 20%. In addition, the transflective film 3 has an average transmissivity greater than 60%, preferably greater than 70%, 80%, or 90%, more preferably even more than 95% for p-polarized light in the visible light range.

Alternatively, in some embodiments, the average reflectivity of the transflective film 3 for a waveband within FWHM of the N spectral lines or bands of the s-polarized light emitted by the image source 1 is not greater than 50%, but in the range between 25% and 50%. In this case, an anti-reflection film 4 should be used (the anti-reflection film 4 will be described in detail later).

In one embodiment, the s-polarized light incident on the transflective film 3 from the image source has three spectral lines or bands in the visible light band. The average reflectivity of the transflective film 3 for a waveband within the FWHM of the three spectral lines or bands is greater than 50%. The average reflectivity of the transflective film 3 for visible light band outside the FWHM of the three spectral lines or bands of the s-polarized light emitted from the image source 1 is lower than the average reflectivity (which is greater than 50%) of the transflective film 3 for the waveband within the FWHM of the three spectral lines or bands of the s-polarized light emitted from the image source by at least 5% or even 10%. In addition, the transflective film has an average transmissivity greater than 60% for p-polarized light in the visible light range.

In another embodiment, the s-polarized light incident on the transflective film 3 from the image source also has three spectral lines or bands in the visible light band. However, the transflective film 3 has an average reflectivity greater than 50% for the waveband within the FWHM of just one or two of the three spectral lines or bands. The transflective film 3 has an average reflectivity for the visible light band outside the FWHM of the three spectral lines or bands of the s-polarized light emitted from the image source 1 lower than the average reflectivity (which is greater than 50%) for the waveband within the FWHM of the three spectral lines or bands of the s-polarized light emitted from the image source by at least 5% or even 10%.

It is to be understood that in another embodiment, the number of spectral lines or bands of the s-polarized light incident on the transflective film 3 from the image source in the visible light band may be any positive integer not less than 1 (denoted by n). The transflective film 3 has an average reflectivity greater than 50% for a waveband within the FWHM of at least one of the N spectral lines or bands. The transflective film 3 has an average reflectivity for the visible light band outside the FWHM of the N spectral lines or bands of the s-polarized light emitted from the image source 1 lower than the average reflectivity (which is greater than 50%) for a waveband within the FWHM of the N spectral lines or bands of the s-polarized light emitted from the image source by at least 5% or even 10%.

Similar to the transflective film 3, the anti-reflection film 4 may cover the entire outer surface of the substrate, or may cover only a portion of the outer surface of the substrate. The anti-reflection film increases the average transmissivity of the imaging window for visible light by more than 3%.

As shown in FIG. 1, the incident angle of the s-polarized light to the transflective film 3 is a, where a ranges from 30 to 89 degrees. In order to achieve a better reflection and transmission effect, the value of a is preferably close to the angle $\tan^{-1}(n2/n1)$, where n1 is the refractive index of the incident medium and n2 is the refractive index of the substrate medium. For example, when n1=1.0, n2=1.52, then $\tan^{-1}(n2/n1)$ is about 56 degrees 40 minutes; when n1=1.0, n2=1.58, $\tan^{-1}(n2/n1)$ is about 57 degrees 40 minutes; when n1=1.0, n2=1.49, $\tan^{-1}(n2/n1)$ is about 56 degrees 08 minutes. The range of $\alpha$ is therefore preferably in the range of 50 to 75 degrees.

The range and preferred angles of a have been exemplified above and those skilled in the art will appreciate that depending on the refractive index of the substrate medium and the refractive index of the incident medium, the angle of $\alpha$ may also be in other ranges.

As further shown in FIG. 1, there is an angle $\theta$ between the image source 1 and the imaging window 2, wherein the angle $\theta$ is in the range of 20 to 70 degrees. Of course, the angle $\theta$ may also be a value in other ranges; for example, in some embodiments, the angle $\theta$ ranges from 80 degrees to 90 degrees.

The spectrum of image source 1 can be comprised of one or several monochromatic spectral lines bands. For example, with reference to the exemplary schematic diagram of the source image spectrum shown in FIG. 2, in order to display color image, the s-polarized light emitted by the image source 1 may be superimposed by three spectral line or band distributions having the peak in the range of 590 nm to 690 nm (red), 500 nm to 565 nm (green), 410 nm to 480 nm (blue), respectively. The average reflectivity of the transflective film 3 for s-polarized wavebands within the FWHM of the three spectral lines or bands is greater than 60%. Preferably, the average transmissivity of the transflective film 3 for s-polarized light outside the FWHM of the three spectral lines or bands is greater than 60%.

In a preferred embodiment, the light source of the image source consists of a three-color laser with the peak positions of the three colors being 445 nm (blue), 532 nm (green), 635 nm (red), respectively. The FWHM of each peak is only about 1-2 nm (see the laser projection spectrum indicated by the solid line in FIG. 2).

While particular wavelength bands of s-polarized light are described above using red, green and blue colors as examples, those skilled in the art will appreciate that the description is exemplary only and is not intended to limit the scope of the invention.

Referring again to FIG. 1, the s-polarized light emitted by the image source 1 is incident on the transflective film 3 of the imaging window 2. The transflective film 3 has an average reflectivity greater than, for example, 60% for wavebands within the FWHM of at least one of N spectral lines or bands of s-polarized light, whereby the image of the image source 1 is re-imaged through the imaging window 2. Further, the ambient light outside the imaging window 2 can penetrate through the imaging window at a relatively high transmissivity (for example, 70% or more), which can form a clear and natural image when incident on the observer's eyes. Thus, the observer can simultaneously view the displayed images of the image source 1 as well as the ambient light.

Figure 3:
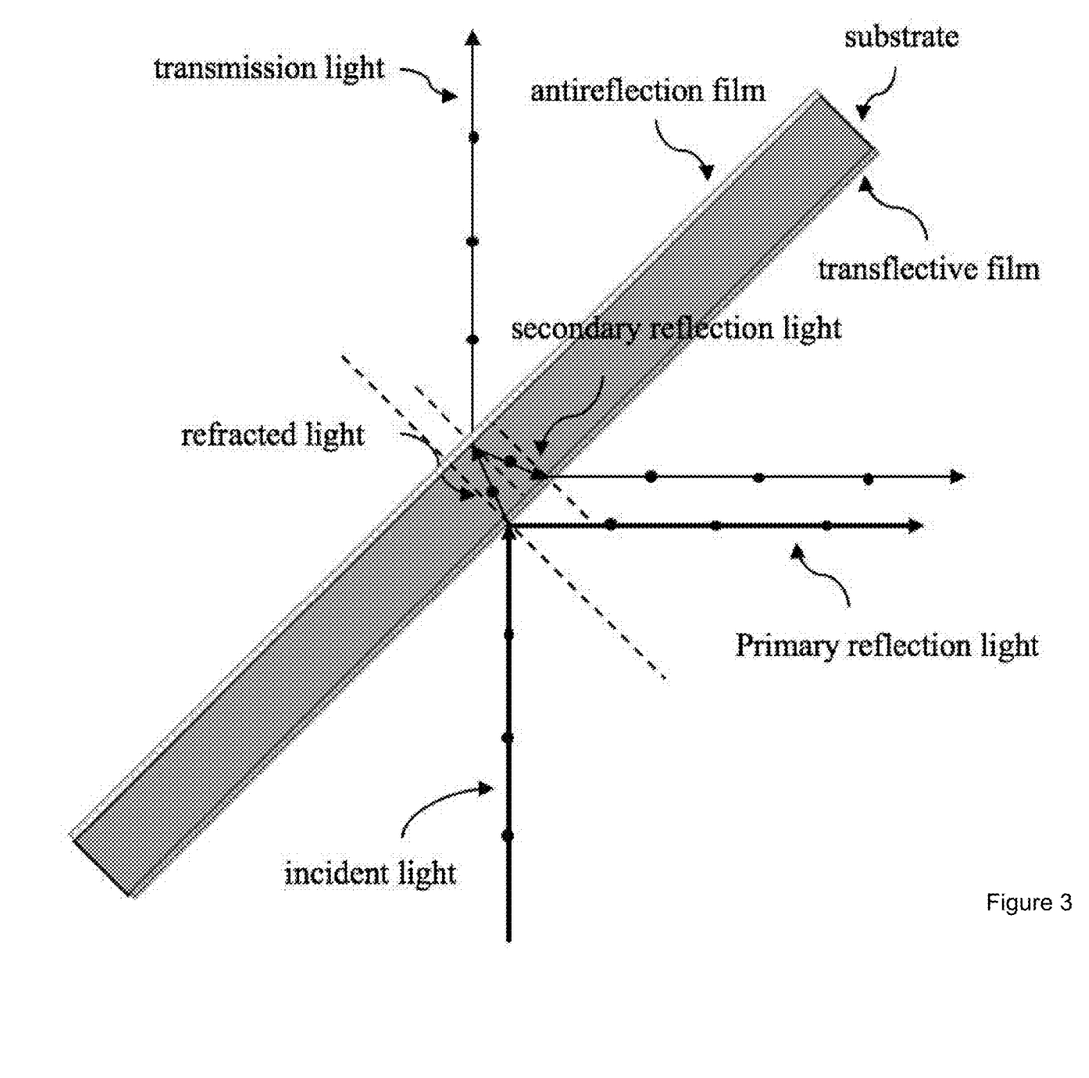
FIG. 3 is an exemplary structural diagram of an imaging window according to one embodiment of the present invention.

FIG. 3 is an exemplary structural diagram of an imaging window according to an embodiment of the present invention. Referring to FIG. 3, the imaging window 2 includes a substrate having an inner surface and an outer surface. A transflective film 3 is disposed on the inner surface of the substrate, and an anti-reflection film 4 is further provided on the outer surface.

In a preferred embodiment, the image source 1 may use s-polarized light having three colors of red, green and blue. For example, the three colors are in the three wavebands of 630 nm±10 nm (red), 540 nm±10 nm (green), 450 nm±10 nm (blue), respectively.

In one embodiment of the present invention, the transflective film coated on the inner surface of the substrate has the following optical characteristics:

(1) for p-polarized light, the transflective film has a transmissivity greater than 95% for all bands;

(2) for s-polarized light, the transflective film has an average reflectivity greater than 70% for one or more optical wavebands corresponding to the image source. For example, it has an average reflectivity greater than 70% for the three bands of 630 nm±10 nm (red), 540 nm±10 nm (green), and 450 nm±10 nm (blue), and has an average transmissivity greater than 70% for other wavebands.

The ghost image problem is first analyzed in the absence of an anti-reflection film. Assuming that the transflective film on the inner surface has an average reflectivity of 70% for a particular s-polarized light having one or more spectral lines or bands and has an average transmissivity greater than 70% for other bands; and the outer surface has a transmissivity of 90% for natural light. Then when the s-polarized light having the one or more optical bands is incident on the transflective film and reflected by the transflective film, the intensity of the primary reflection light of the s-polarized light is about 70% of the intensity of the incident light and the intensity of the s-polarized light refracted into the substrate is about 30% of the intensity of the incident light. The s-polarized light refracted into the substrate will be reflected a second time by the outer surface film, and the light intensity after the secondary reflection is 30%*(1−90%); the secondary reflection light is incident on the transflective film, and the intensity of the light refracted by the transflective film is 30%*(1−90%)*(1−70%)=0.9%.

It can be seen that the intensity of the refracted light is almost negligible compared to the intensity of the primary reflection light. Therefore, no obvious ghost image will be formed in the present invention, thus overcoming the ghost image problem commonly encountered in the prior art using s-polarized light.

The anti-reflection film coated on the outer surface of the substrate enables the outer surface of the imaging window to achieve an average transmissivity greater than 95% for the entire natural light spectrum under normal daylight conditions.

Next, the ghost image problem is analyzed in conjunction with the transflective film and the anti-reflection film in the above-described embodiment. Assuming that the transflective film on the inner surface has an average reflectivity of 70% for a particular s-polarized light having one or more spectral lines or bands and has an average transmissivity greater than 70% for other bands; and the outer surface has a transmissivity of 95% for natural light due to the presence of the anti-reflection film. Then when the s-polarized light having the one or more optical bands is incident on the transflective film and reflected by the transflective film, the intensity of the primary reflection light of the s-polarized light is about 70% of the intensity of the incident light and the intensity of the s-polarized light refracted into the substrate is about 30% of the intensity of the incident light. The s-polarized light refracted into the substrate will be reflected a second time by the anti-reflection film, and the light intensity after the secondary reflection is 30%*(1−95%); the secondary reflection light is incident on the transflective film, and the intensity of the light refracted by the transflective film is 30%*(1−95%)*(1−70%)=0.45%.

It can be seen that with the specific structure in which the inner surface of the substrate is provided with a transflective film and the outer surface thereof is provided with an anti-reflection film, the imaging window of the present invention further significantly reduces the ghost image problem.

Next, the combined transmissivity and reflectivity in the embodiment is analyzed in accordance with the optical characteristics of the above-mentioned transflective film:

(1) reflectivity: since the image source adopts s-polarized light, and since the reflection characteristic of the coating has high correspondence with the image source, it can be known from the reflection characteristics of the coating that the average reflectivity R>70%;

(2) transmissivity: under general circumstances, assuming that the ambient natural light contains 50% p-polarized light and 50% s-polarized light; for p-polarized light, the average transmissivity is above 90%; for s-polarized light, and the average transmissivity thereof in the visible band (about 400 nm to 700 nm) is {(20+20+20)*0.3+[700−400−(20+20+20)]*0.7}/(700−400)≈62%; thus the average transmissivity for the entire natural light T≈95%*50%+62%*50%=78.5%.

In summary, due to the use of an image source having characteristics and a coating having a reflection characteristic corresponding to the source characteristics of the image source, the embodiments of the present invention can achieve a sum of the average transmissivity for visible light T and the average reflectivity R for a particular light source of the image source greater than 148.5% (T+R>148.5%), thereby obtaining an imaging effect with both high transmissivity and high reflectivity.

In addition, the narrower the FWHM of the light source spectrum and the reflection characteristic spectrum of the reflective film is, the higher transmissivity can be obtained while ensuring the reflectivity.

Figure 2:
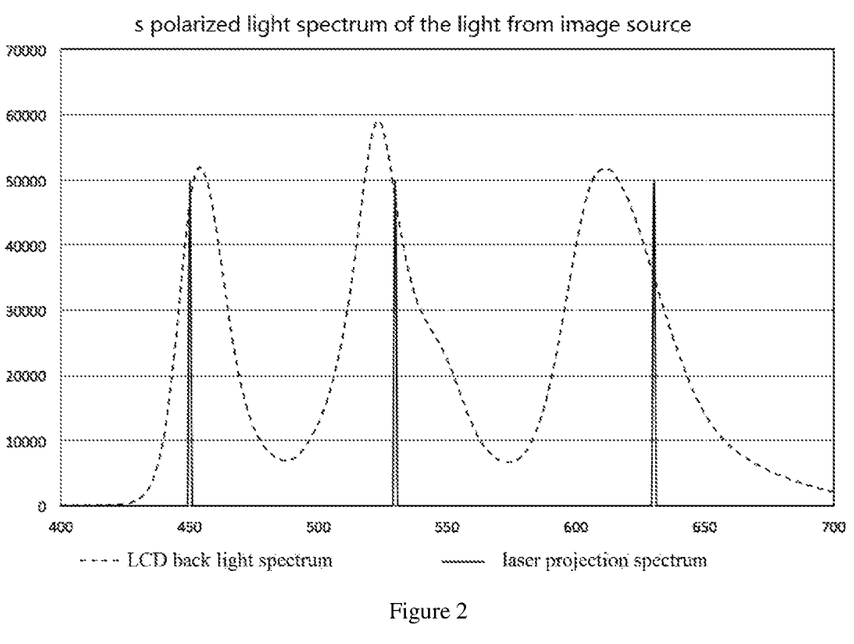
FIG. 2 is an exemplary schematic diagram showing the distribution of three spectral lines or bands according to one embodiment of the present invention.

In a more preferred embodiment, the light source for a set of image sources shown in FIG. 2 consists of a three-color laser with the peak positions of the three colors being 445 nm (blue), 532 nm (green), 635 nm (red), respectively. The FWHM of each peak is only about 1-2 nm (see the laser projection spectrum indicated by solid line in FIG. 2). With such a light source, a special corresponding transflective film is adopted for a particular angle range, for example, a range where the first angle is 55 degrees to 65 degrees. The transflective film has a reflectivity of 95% for s-polarized light in the three spectral bands 444 nm to 446 nm, 531 nm to 533 nm, and 634 nm to 636 nm, has a transmissivity of 95% for s-polarized light outside the three bands, and has transmissivity of 95% for p-polarized light in the visible light range.

The combined transmissivity and reflectivity in the embodiment is analyzed as follows:

(1) reflectivity: since the image source adopts s-polarized light, and since the reflection characteristic of the coating has high correspondence with the image source, it can be known from the reflection characteristic of the coating that the average reflectivity R>95%;

(2) transmissivity: under general circumstances, assuming that the ambient natural light contains 50% p-polarized light and 50% s-polarized light; for p-polarized light, the average transmissivity is above 90%; for s-polarized light, and the average transmissivity thereof in the visible band (about 400 nm to 700 nm) is {(2+2+2)*0.05+[700−400−(2+2+2)]*0.95}1/(700−400)≈93.2%; thus, the average transmissivity for the entire natural light T≈95%*50%+93.2%*50%=94.25%.

In summary, due to the use of an image source having polarization and spectra characteristics and a coating having a reflection characteristic corresponding to the characteristics of the image source, the embodiments of the present invention can achieve a sum of the average transmissivity for visible light T and the average reflectivity R for a particular light source of the image source greater than 189% (T+R>189%), thereby obtaining an imaging effect with both high transmissivity and high reflectivity.

Figure 4:
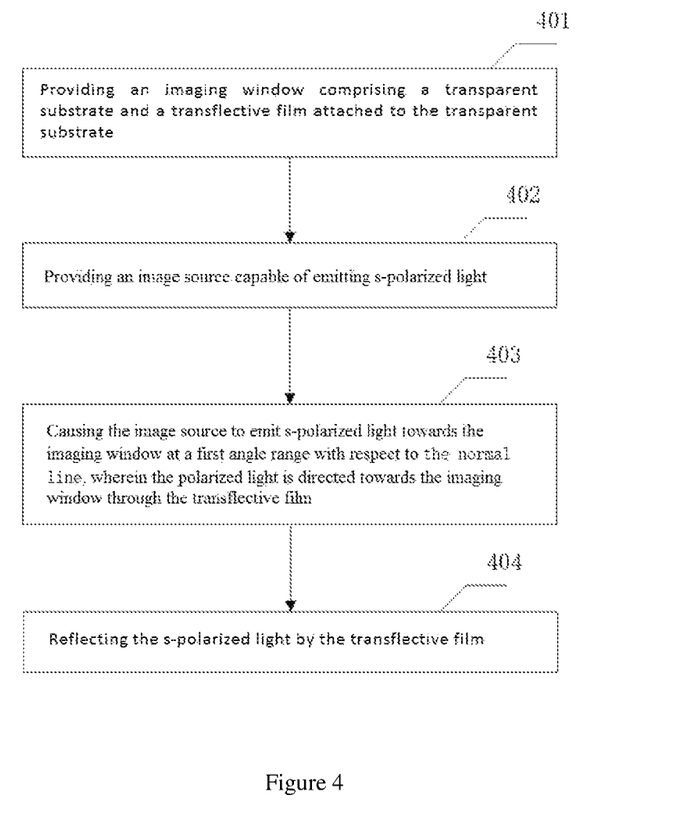
FIG. 4 is an exemplary flow chart of a displaying method according to an embodiment of the present invention.
Figure 5:
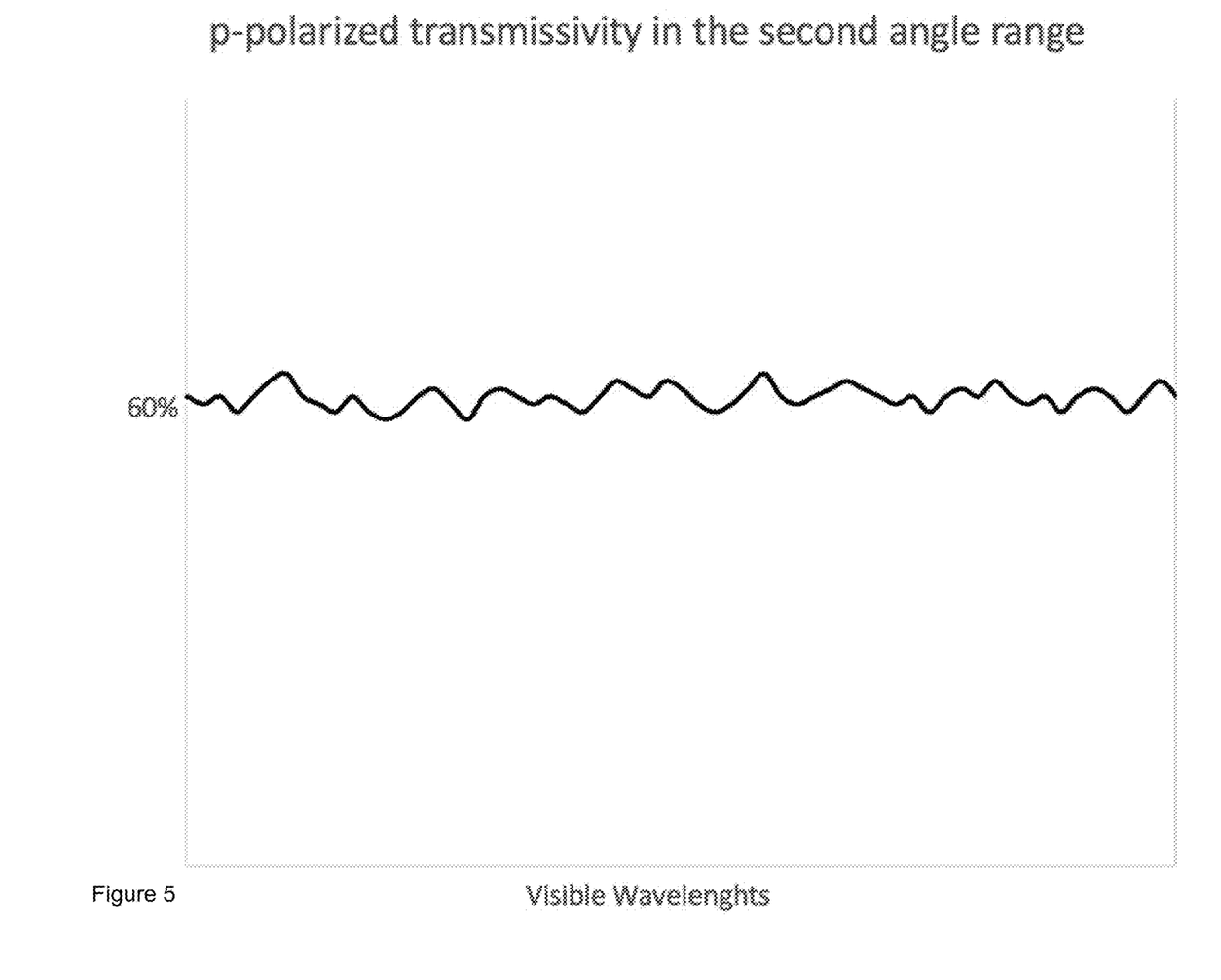
FIG. 5 schematically shows the features of claim 1 related to the p-polarized light according to one embodiment of the present invention.
Figure 6:
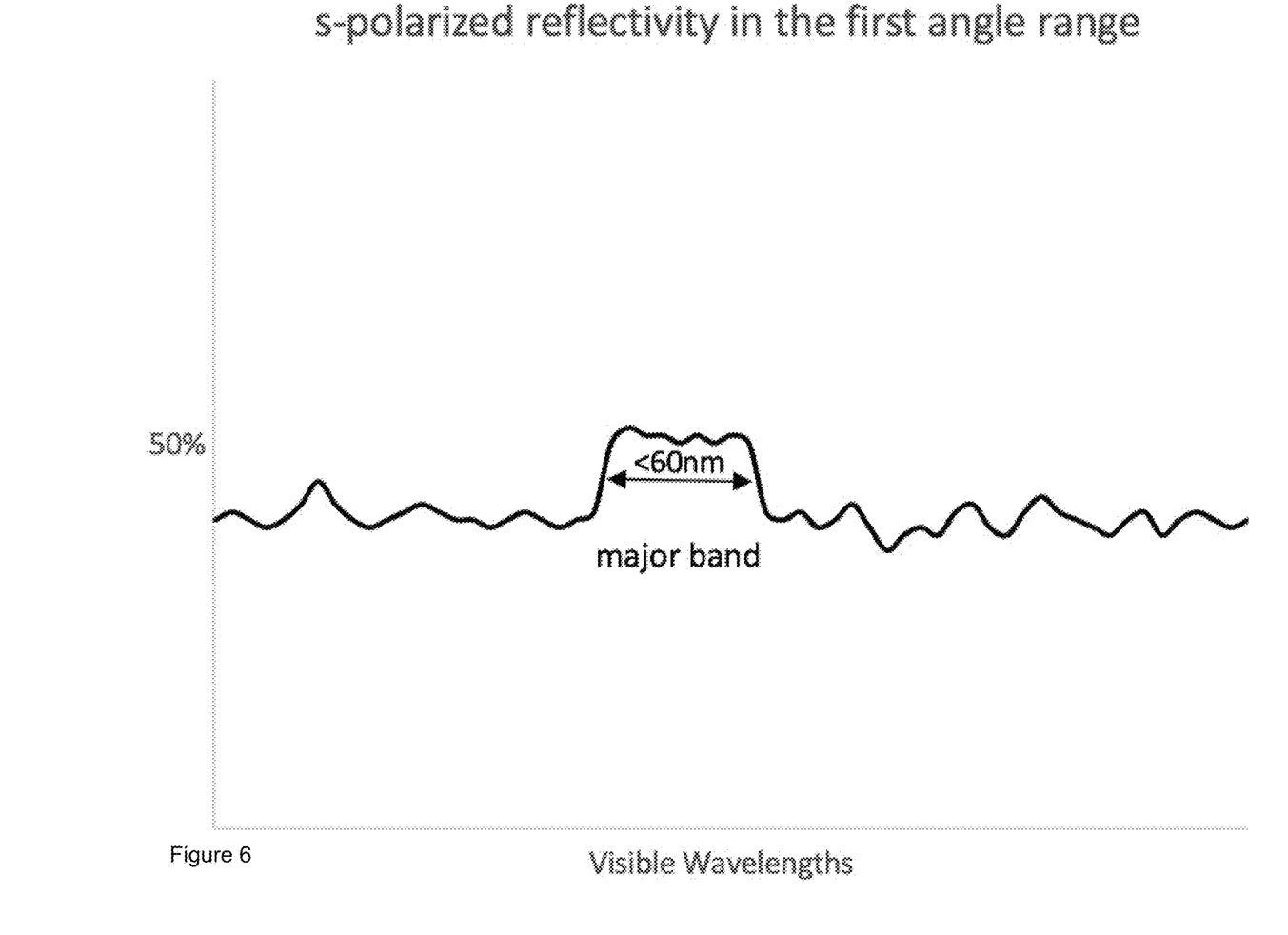
FIG. 6 schematically shows the features of claim 1 related to the s-polarized light according to one according to one embodiment of the present invention.
Figure 7:
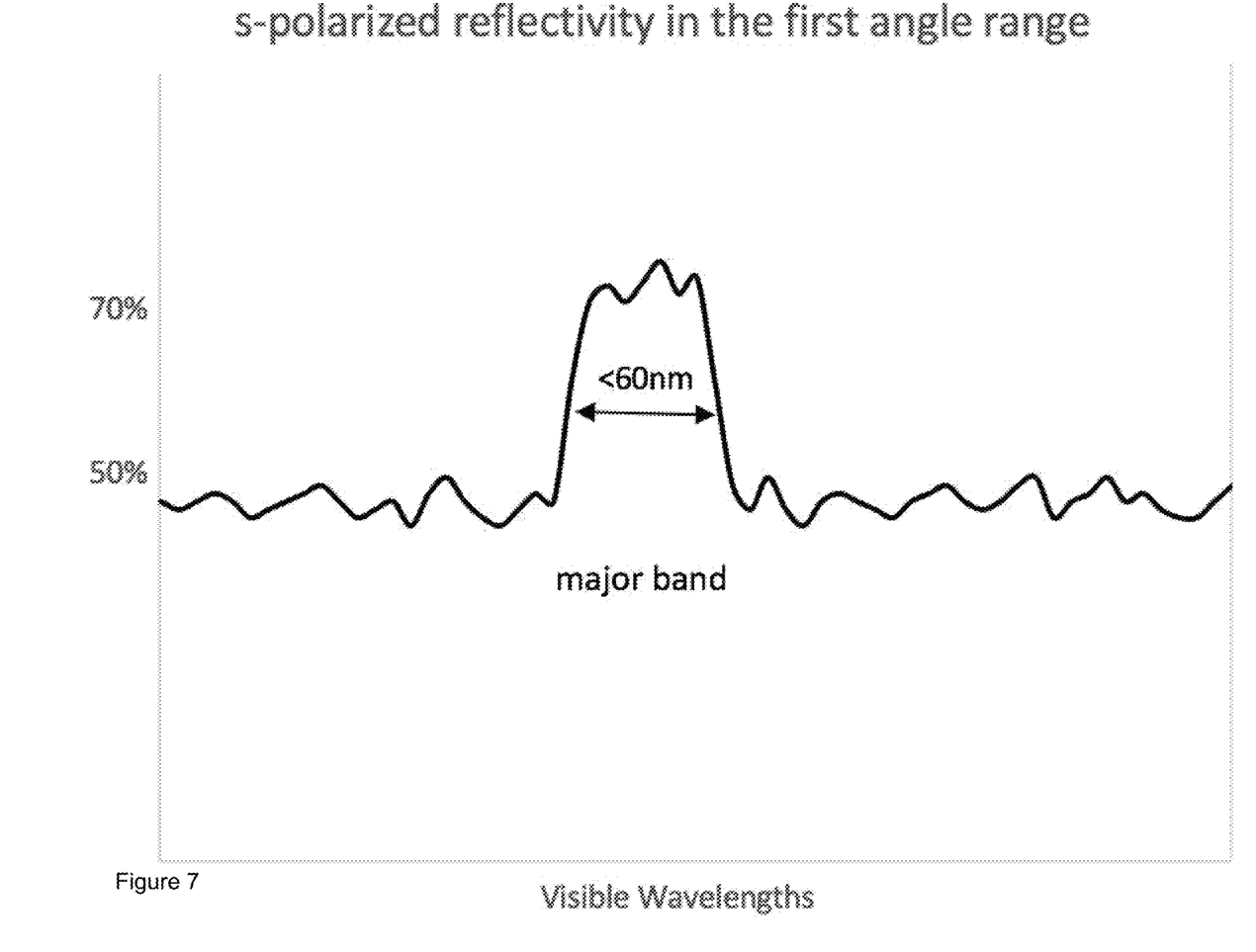
FIG. 7 schematically shows the features of claim 6 related to the s-polarized light according to one embodiment of the present invention.
Figure 8:
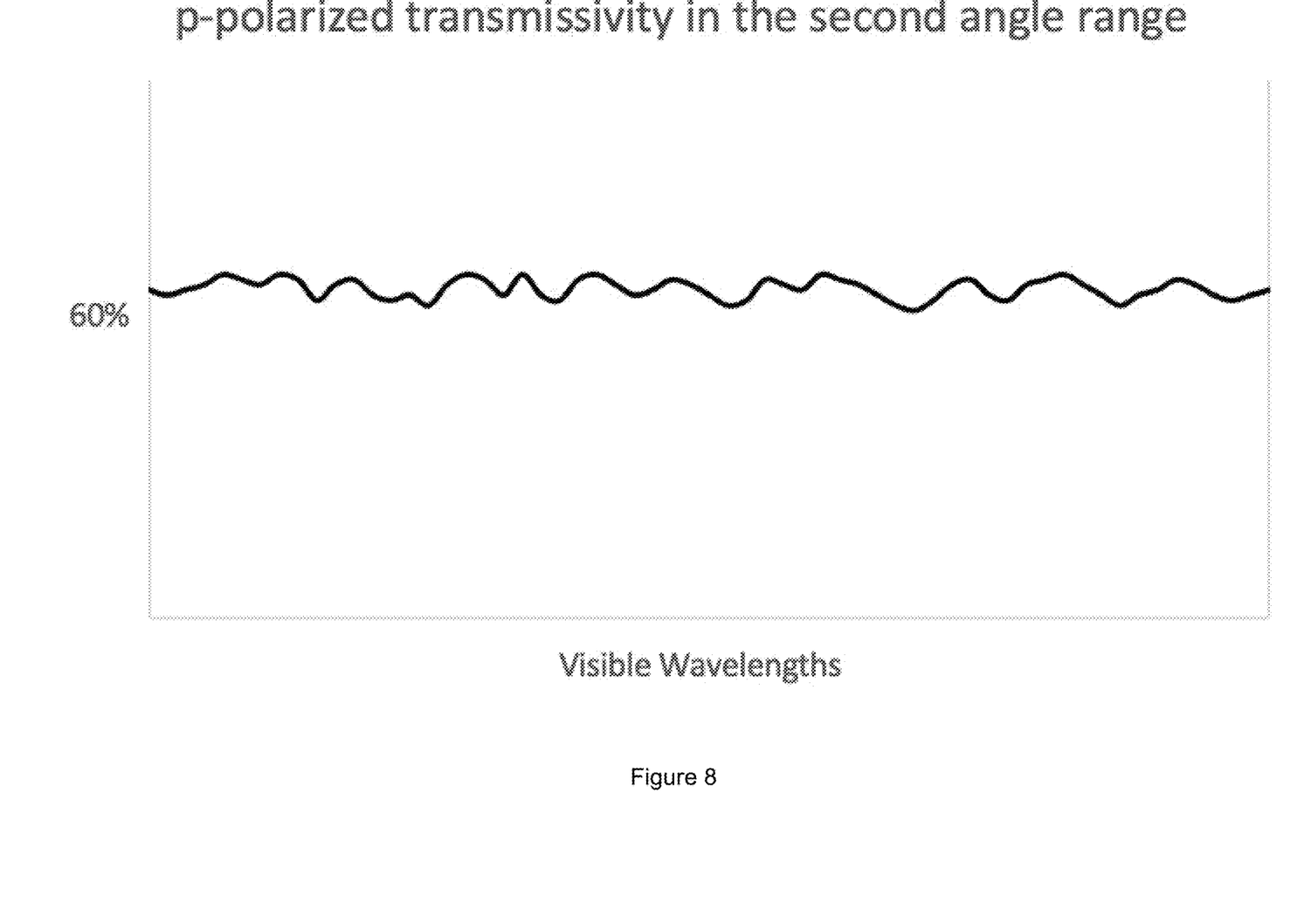
FIG. 8 schematically shows the features of claim 10 related to the p-polarized light according to one embodiment of the present invention.
Figure 9:
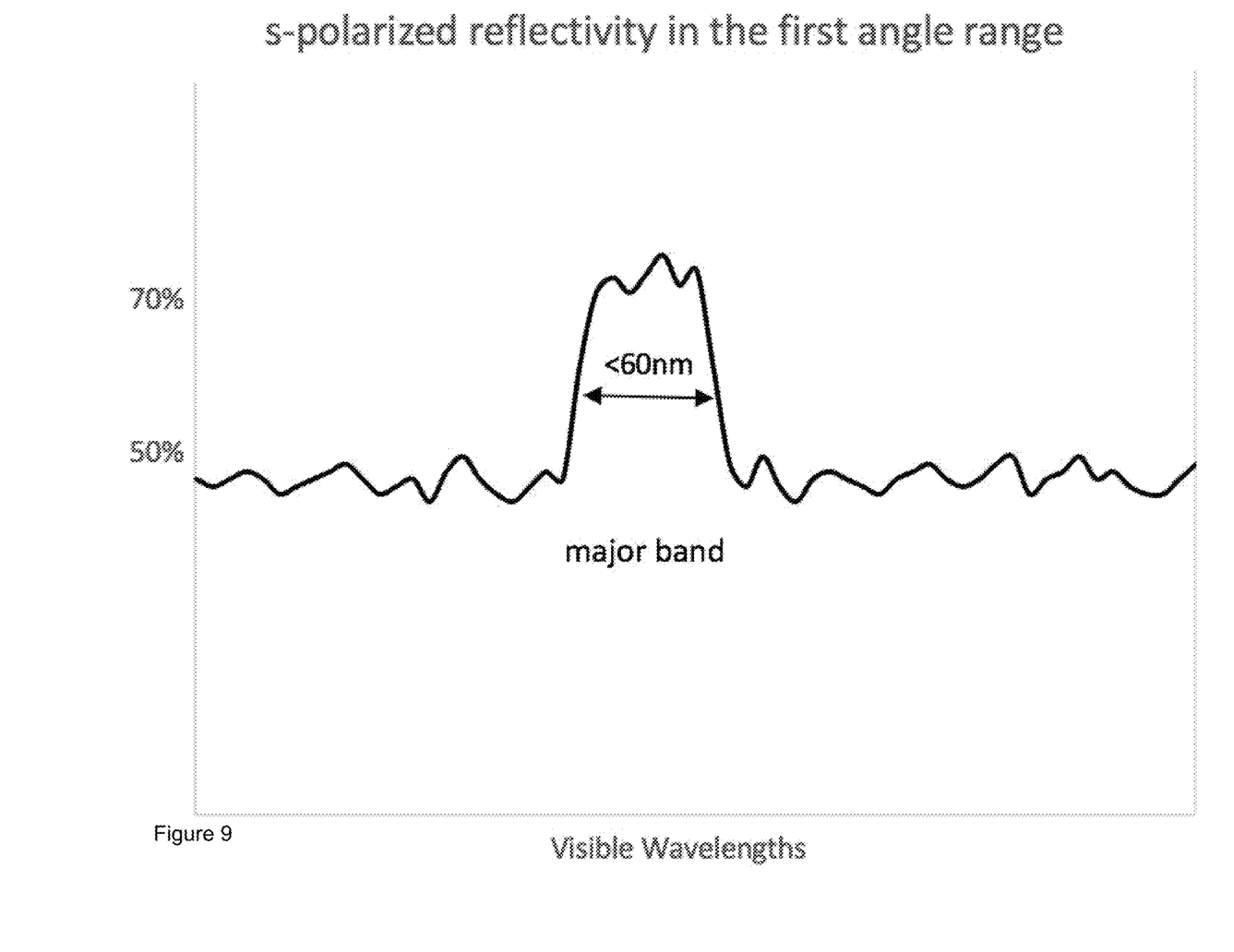
FIG. 9 schematically shows the features of claim 10 related to the s-polarized light according to an embodiment of the present invention.

FIG. 4 is an exemplary flow chart of a displaying method according to an embodiment of the present invention. As shown, the method comprises:

step 401: providing an imaging window comprising a transparent substrate and a transflective film attached to the transparent substrate;

step 402: providing an image source capable of emitting s-polarized light;

step 403: causing the image source to emit s-polarized light to the imaging window in a first angle range with respect to the normal line, where the polarized light is directed toward the imaging window through the transflective film;

step 404: reflecting the s-polarized light by the transflective film;

where the s-polarized light has N spectral lines or bands in the visible light band, where N is a positive integer not less than 1, and preferably N is equal to or greater than 3; the FWHM of the spectral lines or bands is less than or equal to 60 nm; where within the first angle range, the transflective film has an average reflectivity greater than 50% for wavebands within the FWHM of at least one of the N spectral lines or bands of the s-polarized light emitted by the image source; the transflective film has an average reflectivity for visible light band outside the FWHM of the N spectral lines or bands of the s-polarized light emitted by the image source at least 5% and even 10% lower than the average reflectivity greater than 50% for wavebands within the FWHM of the N spectral lines or bands of the s-polarized light emitted by the image source; where the transflective film has an average transmissivity greater than 60% for p-polarized light in the visible range within the second angle range with respect to the normal line, where the first angle range is 30 to 89 degrees, preferably 50 degrees to 75 degrees; and the second angle range is 30 degrees to 80 degrees, preferably 55 degrees to 70 degrees.

In another embodiment, the s-polarized light has N spectral lines or bands in the visible light band, where N is a positive integer not less than 1, and preferably N is equal to or greater than 3; the FWHM of the spectral lines or bands is less than or equal to 60 nm; where within the first angle range, the transflective film has an average reflectivity in the range of 25% to 50% for wavebands within the FWHM of the 3 or more spectral lines or bands of the s-polarized light emitted by the image source, and has an average reflectivity for visible light band outside the FWHM of the N spectral lines or bands of the s-polarized light at least 5% lower than the average reflectivity for the former; and the transflective film has an average transmissivity greater than 60% for p-polarized light in the visible range within the second angle range with respect to the normal line.

The displaying system and method of the embodiments of the present invention can be applied in a variety of applications, e.g., to various head-up displays (HUDs) when used together with a base or pedestal; of course, they can also be used in vehicles such as automobiles or aircrafts.

According to the embodiments of the present invention, light from the image source and ambient light can be incident to the observer's eyes at the same time to form a clear image, thereby presenting the image of the image source to the observer's eyes without affecting the observer's observation of the external environment. In the embodiments of the present invention, s-polarized three-color lights are used as the image source of reflection, and meanwhile an imaging window with s-polarized narrow-band high-reflectivity film is used. Since the spectral bands of the image source and the transflective film are well matched, and since the s-polarized light is not affected by a Brewster's angle, the reflectivity of the light from the image source is greatly improved as compared with the conventional technique, the utilization efficiency of the reflection light is high, and thus the entire optical system can be realized with a lower power consumption. In addition, since a high reflectivity can be obtained on a transflective film on the inner surface of the substrate, and since an anti-reflection film is provided on the outer surface of the substrate, the ghost image problem can be well suppressed. Further, the observer's perception of the ambient light is almost not affected, since the same optical information can be obtained from the p-polarized ambient light, even if some band of the s-polarized spectrum of the ambient light is filtered.

The foregoing description of the disclosed embodiments will enable those skilled in the art to carry out or use the present invention. It is to be understood that the features disclosed in the above embodiments may be used alone or in combination, unless otherwise specified. Numerous modifications to these embodiments will be readily apparent to those skilled in the art, and the general principles defined herein may be implemented in other embodiments without departing from the spirit or scope of the invention. Accordingly, the embodiments of the present invention disclosed herein is not limited to the specific embodiments disclosed, but is intended to cover modifications within the spirit and scope of the invention as defined by the appended claims.

The invention claimed is:

1. A heads-up displaying system comprising:
an imaging window including a transparent substrate and a transflective film attached to a first surface of the transparent substrate;
an image source that emits s-polarized light incident on the imaging window through the transflective film, and light emitted by the image source before reaching the transflective film only including the s-polarized light,
the transflective film reflecting a first portion of the s-polarized light at a first angle with respect to the normal line,
wherein the transparent substrate includes a second surface opposite to the first surface, the second surface reflects a second portion of the s-polarized light at the first angle with respect to the normal line, and transmits a third portion of the s-polarized light to the air, the first portion of the s-polarized light, the second portion of the s-polarized light and the third portion of the s-polarized light are all s-polarized light,
wherein the s-polarized light emitted by the image source before reaching the transflective film has N spectral lines or bands in the visible light band,
wherein N is a positive integer not less than 1; and
the N spectral lines or bands each have a FWHM (full-width at half-maximum) equal to or less than 60 nm, and for each of the N spectral lines or bands in the visible spectra of the s-polarized light emitted from the image source, a major band is defined as the spectra band centered at the peak of the line or the band and expanding up to the FWHM;
the transflective film transmitting ambient light at a second angle with respect to the normal line,
wherein the first angle is 30 to 89 degrees, and the second angle is 30 degrees to 80 degrees;
at the first angle, the average s-polarized reflectivity of the transflective film, of at least one of the N major bands, is greater than 50%, with the at least one of the N major bands being defined as at least one principal bands; at the first angle, the average s-polarized reflectivity, of the transflective film, for visible bands outside the N major bands, is at least 5% lower than that for the at least one principal bands;
at the second angle, the transflective film has an average transmissivity greater than 60% for p-polarized light in the visible range;
wherein the transflective film is formed by stacking at least two types of film layers having different refractive indexes, and
the transflective film is so arranged that it contacts with the transparent substrate on a first side and with the air on a second side, the second side is configured to directly reflect the s-polarized light emitted from the image source to an observation region, and the image source and the observation region are located on a same side of the transflective film.

2. The displaying system according to claim 1, wherein an anti-reflection film is disposed on the second surface of the transparent substrate, the s-polarized light incident on the imaging window subsequently through the transflective film the transparent substrate and the anti-reflection film;
the anti-reflection film reflects the second portion of the s-polarized light and transmits the third portion of the s-polarized light to the air;
and the anti-reflection film increases an average transmissivity of the imaging window for visible light by at least 3% or more as compared with a situation where the anti-reflection film is not disposed.

3. The displaying system according to claim 1, wherein the N spectral lines or bands comprise at least three spectral lines or bands, wherein a peak position of the first spectral line or band is in the range of 410 nm to 480 nm, a peak position of the second spectral line or band is in the range of 500 nm to 565 nm, and a peak position of the third spectral line or band is in the range of 590 nm to 690 nm.

4. The displaying system according to claim 1, wherein the first angle is 50 degrees to 75 degrees and the second angle is 55 degrees to 70 degrees.

5. The displaying system according to claim 1, wherein the transflective film, at the second angle, has an average transmissivity greater than 80% for the p-polarized light in the visible range.

6. The displaying system according to claim 1, wherein the transflective film has an average reflectivity greater than 70% for the N major bands of the s-polarized light at the first angle; and the transflective film has an average reflectivity less than 50% for visible light band outside the N major bands of the s-polarized light.

7. The displaying system according to claim 1, wherein the image source is a displaying apparatus that emits a virtual image or a real image, or a virtual or real image formed by such displaying apparatus.

8. The displaying system according to claim 1, wherein a light source of the image source comprises a laser, a light emitting diode, an organic light emitting diode, an excited fluorescent light emitting material, a quantum dot excitation light source, or any combinations thereof.

9. A vehicle comprising a displaying system according to claim 1.

10. The vehicle according to claim 9, wherein the N spectral lines or bands comprise at least three spectral lines or bands, wherein a peak position of the first spectral line or band is in the range of 410 nm to 480 nm, a peak position of the second spectral line or band is in the range of 500 nm to 565 nm, and a peak position of the third spectral line or band is in the range of 590 nm to 690 nm.

11. The vehicle according to claim 9, wherein the first angle is 50 degrees to 75 degrees and wherein the second angle is 55 degrees to 70 degrees.

12. The displaying system according to claim 1, wherein the composition of each of the at least two types of film layers is selected from one or more of tantalum pentoxide, titanium oxide, magnesium oxide, zinc oxide, zirconium oxide, silicon dioxide, magnesium fluoride, silicon nitride, silicon oxynitride, and aluminum fluoride.

13. The displaying system according to claim 1, wherein the first angle is 55 degrees to 65 degrees, the transflective film has an average reflectivity greater than 95% for the N major bands of the s-polarized light at the first angle, the transflective film has an average transmissivity greater than 95% for visible light band outside the N major bands of the s-polarized light, and the transflective film has an average transmissivity greater than 95% for the p-polarized light in the visible range.

14. The displaying system according to claim 13, wherein the N spectral lines or bands comprise three spectral lines or bands, wherein a peak position of the first spectral line or band is in the range of 444 nm to 446 nm, a peak position of the second spectral line or band is in the range of 531 nm to 533 nm, and a peak position of the third spectral line or band is in the range of 634 nm to 636 nm.

15. A heads-up displaying system comprising:
an imaging window including a transparent substrate having a first surface and a second surface, a transflective film attached to the first surface of the transparent substrate, and an anti-reflection film attached to the second surface of the transparent substrate; and
an image source for emitting s-polarized light incident on the imaging window subsequently through the transflective film, the transparent substrate and the anti-reflection film,
the transflective film reflecting a first portion of the s-polarized light at a first angle with respect to the normal line,
wherein the anti-reflection film reflects a second portion of the s-polarized light at the first angle with respect to the normal line, and transmits a third portion of the s-polarized light to the air;
the first portion of the s-polarized light, the second portion of the s-polarized light and the third portion of the s-polarized light are all s-polarized light,
wherein both the anti-reflection film and the transflective film transmit ambient light at a second angle with respect to the normal line;
wherein the s-polarized light emitted by the image source before reaching the transflective film has N spectral lines or bands in the visible light band, and light emitted by the image source before reaching the transflective film only includes the s-polarized light,
wherein N is a positive integer not less than 1; and
wherein the spectral lines or bands have a full-width at half-maximum equal to or less than 60 nm, and for each of the N spectral lines or bands in the visible spectra of the s-polarized light emitted from the image source, a major band is defined as the spectra band centered at the peak of the line or the band and expanding up to the FWHM;
wherein the first angle is 30 to 89 degrees, and the second angle is 30 degrees to 80 degrees;
wherein at the first angle, the transflective film has an average reflectivity in the range of 25% to 50% for the N major bands of the s-polarized light;
wherein the transflective film has an average reflectivity for visible light bands outside the N major bands of the s-polarized light at least 5% lower than the average reflectivity for the N major bands;
wherein the transflective film has an average transmissivity greater than 60% for p-polarized light in the visible range at the second angle; and
wherein the anti-reflection film increases the average transmissivity of the imaging window for visible light by at least 3% as compared with a situation where the anti-reflection film is not disposed;
wherein the transflective film is formed by stacking at least two types of film layers having different refractive indexes, and wherein the composition of each of the at least two types of film layers is selected from one or more of tantalum pentoxide, titanium oxide, magnesium oxide, zinc oxide, zirconium oxide, silicon dioxide, magnesium fluoride, silicon nitride, silicon oxynitride, and aluminum fluoride, and
wherein the transflective film is so arranged that it contacts with the transparent substrate on a first side and with the air on a second side, the second side is configured to directly reflect the s-polarized light emitted from the image source to an observation region, and the image source and the observation region are located on a same side of the transflective film.

16. The displaying system according to claim 15, wherein the N spectral lines or bands comprise at least three spectral lines or bands, wherein a peak position of the first spectral line or band is in the range of 410 nm to 480 nm; wherein a peak position of the second spectral line or band is in the range of 500 nm to 565 nm, and wherein a peak position of the third spectral line or band is in the range of 590 nm to 690 nm.

17. The displaying system according to claim 15, wherein the first angle is 50 degrees to 75 degrees, and wherein the second angle is 55 degrees to 70 degrees.

18. The displaying system according to claim 15, wherein the transflective film, at the second angle, has an average transmissivity greater than 80% for the p-polarized light in the visible range.

19. The displaying system according to claim 15, wherein the image source is a displaying apparatus that emits a virtual image or a real image, or a virtual or real image formed by such displaying apparatus.

20. The displaying system according to claim 15, wherein a light source of the image source comprises a laser, a light emitting diode, an organic light emitting diode, an excited fluorescent light emitting material, a quantum dot excitation light source, or any combinations thereof.

\* \* \* \* \*